United States Patent
Nay

(10) Patent No.: US 9,141,370 B1
(45) Date of Patent: Sep. 22, 2015

(54) UPDATING CONTROL DEVICES IN A DATA CENTER

(71) Applicant: Google Inc., Mountain View, CA (US)

(72) Inventor: Shane R. Nay, San Jose, CA (US)

(73) Assignee: Google Inc., Mountain View, CA (US)

( * ) Notice: Subject to any disclaimer, the term of this patent is extended or adjusted under 35 U.S.C. 154(b) by 253 days.

(21) Appl. No.: 13/799,607

(22) Filed: Mar. 13, 2013

Related U.S. Application Data

(60) Provisional application No. 61/677,182, filed on Jul. 30, 2012.

(51) Int. Cl.
*G06F 9/44* (2006.01)
*G06F 9/445* (2006.01)

(52) U.S. Cl.
CPC .. *G06F 8/65* (2013.01); *G06F 8/61* (2013.01); *G06F 8/66* (2013.01)

(58) Field of Classification Search
CPC ......... G06F 8/65; G06F 8/61; G06F 11/1433; G06F 8/66; G06F 3/0607; G06F 3/123; G06F 11/1417; G06F 21/572; G06F 8/71; G06F 9/4401
See application file for complete search history.

(56) References Cited

U.S. PATENT DOCUMENTS

| | | | | |
|---|---|---|---|---|
| 7,870,379 | B2 * | 1/2011 | Krieger et al. | 717/168 |
| 8,409,009 | B2 * | 4/2013 | Motyl et al. | 717/170 |
| 2007/0250830 | A1 * | 10/2007 | Holmberg et al. | 717/171 |
| 2008/0086652 | A1 * | 4/2008 | Krieger et al. | 713/330 |
| 2009/0064122 | A1 * | 3/2009 | Bielski | 717/168 |
| 2010/0169876 | A1 * | 7/2010 | Mann | 717/170 |
| 2012/0216183 | A1 * | 8/2012 | Mahajan et al. | 717/170 |
| 2013/0227543 | A1 * | 8/2013 | Chen | 717/173 |

OTHER PUBLICATIONS

Leslie Liu et al.; Cloud Service Portal for Mobile Device Management; 2010 IEEE; pp. 474-478; <http://ieeexplore.ieee.org/stamp/stamp.jsp?tp=&arnumber=5704301>.*
Dennis K. Nilsson et al.; Secure Firmware Updates over the Air in Intelligent Vehicles; 2008 IEEE; pp. 380-384; <http://ieeexplore.ieee.org/stamp/stamp.jsp?tp=&arnumber=4531926>.*
Dennis K. Nilsson et al.; A Framework for Self-Verification of Firmware Updates over the Air in Vehicle ECUs; 2008 IEEE; 5 pages; <http://ieeexplore.ieee.org/stamp/stamp.jsp?tp=&arnumber=4746641>.*
Muhammad Sabir Idrees et al.; Secure Automotive On-Board Protocols A Case of Over-the-Air Firmware Updates; 2011 Springer; pp. 224-238; <http://link.springer.com/chapter/10.1007/978-3-642-19786-4_20#page-1>.*
Syed Riffat Ali; Implementation of Firmware on SPC Switching Systems; 1988 IEEE; pp. 1401-1404; <http://ieeexplore.ieee.org/stamp/stamp.jsp?tp=&arnumber=7874>.*
Jinsik Kim et al.; Remote Progressive Firmware Update for Flash-Based Networked Embedded Systems; 2009 ACM; pp. 407-412; <http://dl.acm.org/citation.cfm?id=1594337>.*

* cited by examiner

*Primary Examiner* — Thuy Dao
*Assistant Examiner* — Cuong V Luu
(74) *Attorney, Agent, or Firm* — Lerner, David, Littenberg, Krumholz & Mentlik, LLP

(57) ABSTRACT

A method and apparatus are provided for updating software one or more control devices in a data center. According to the method and apparatus a data center is outfitted with a plurality of control devices responsible for controlling the operation of a data center component. An update server is configured to update software running one of the plurality of control devices whenever software running on another one of the plurality of control devices is updated.

26 Claims, 13 Drawing Sheets

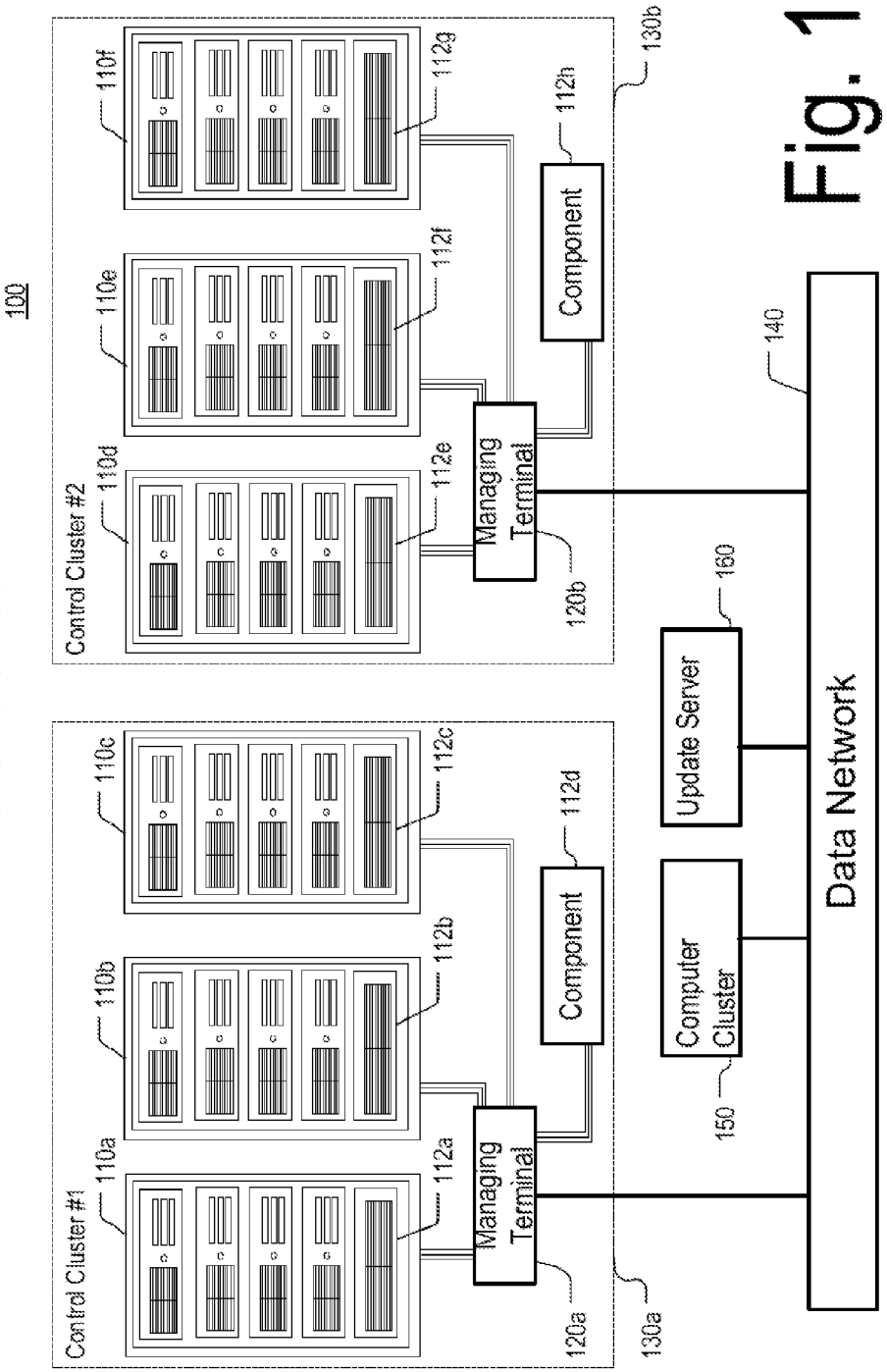

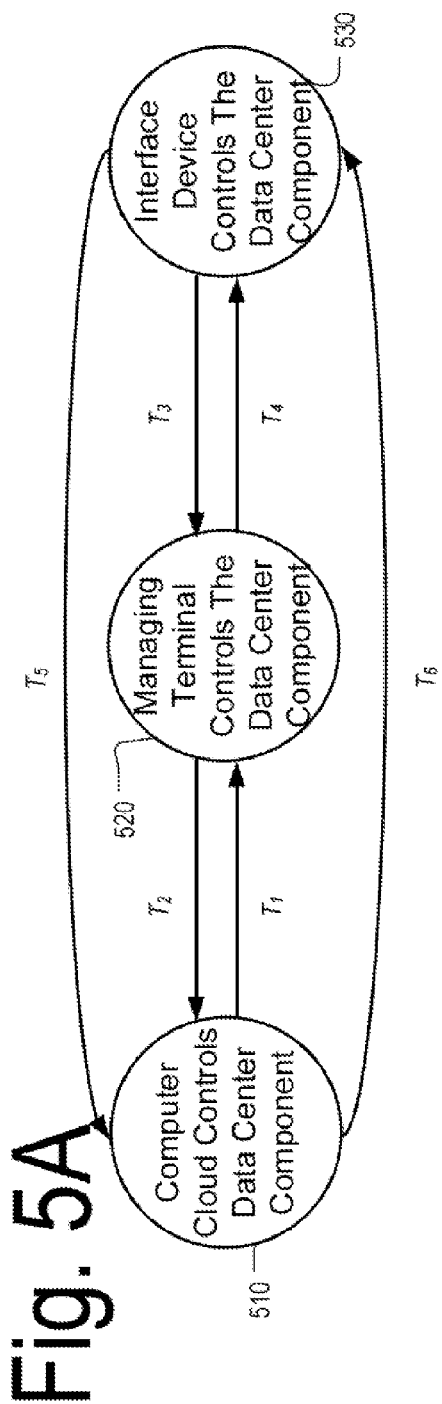

Fig. 5A

State 510
A: Computer cloud generates a control signal and transmits it to the managing terminal.
B: Managing terminal receives the generated control signal and relays it to the interface device.
C: Interface device receives the relayed control signal and further relays it to a data center component.
D: Data center component receives the relayed control signal and changes at least one aspect of its operation in response.

State 520
A: Computer cloud does not participate in generating a control signal used for controlling the data center component.
B: Managing terminal generates a control signal and transmits it to the interface device.
C: Interface device receives the generated control signal and relays it to the data center component.
D: Data center component receives the relayed control signal and changes at least one aspect of its operation in response.

State 530
A: Computer cloud does not participate in generating a control signal used for controlling the data center component.
B: Managing terminal does not participate in generating a control signal used to control the data center component.
C: Interface device generates a control signal and transmits it to the data center component.
D: Data center component receives the control signal and changes at least one aspect of its operation in response.

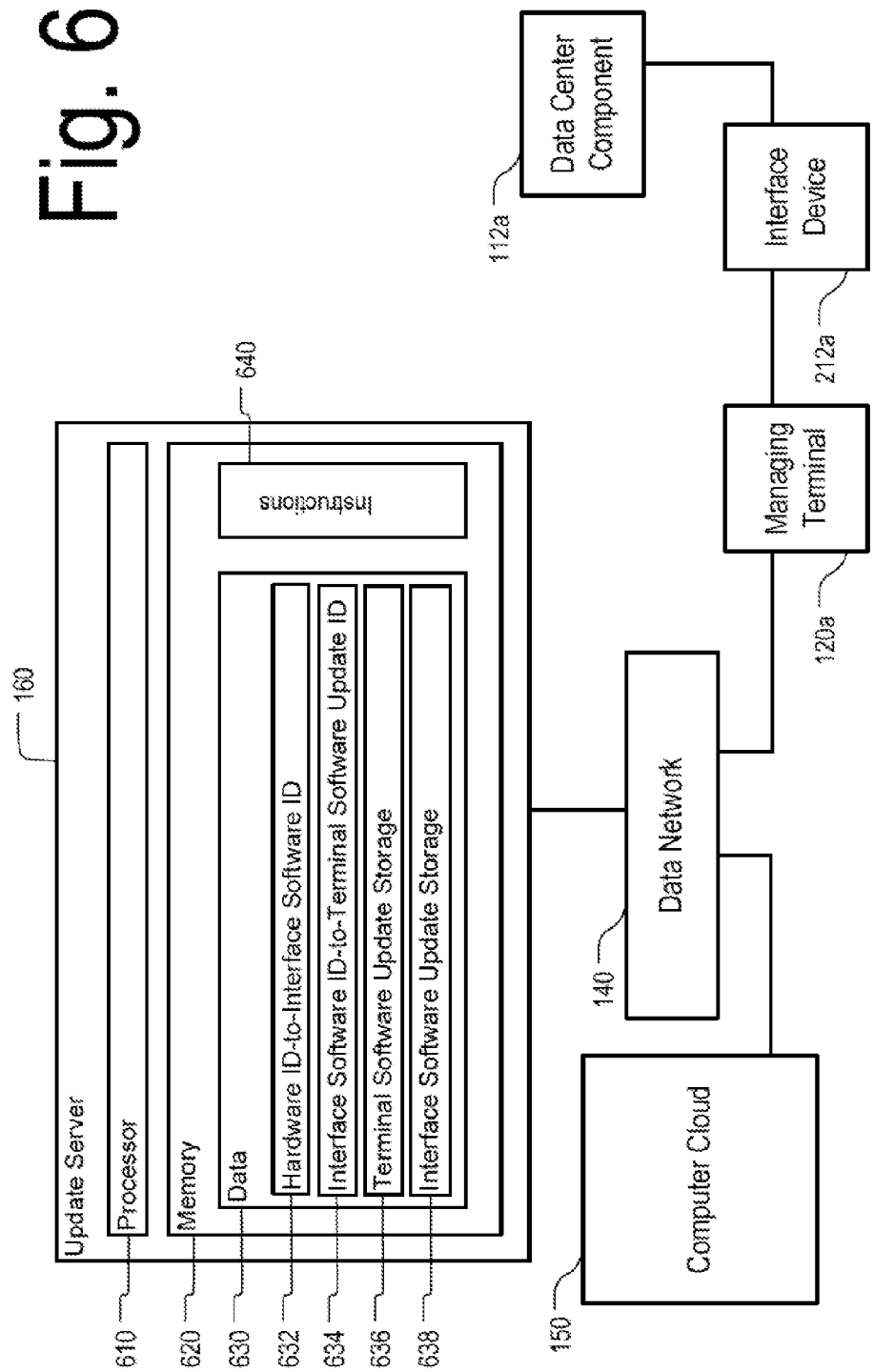

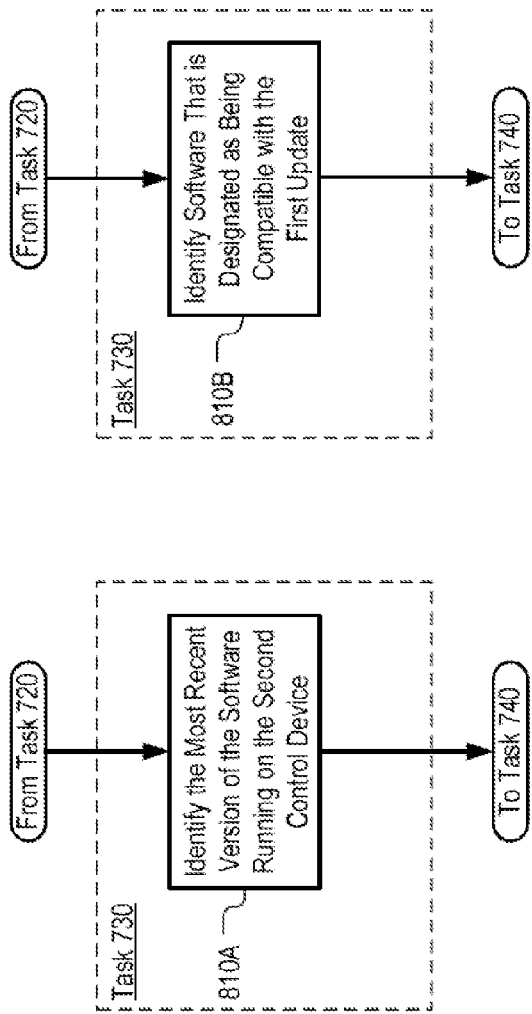

UPDATING CONTROL DEVICES IN A DATA CENTER

CROSS-REFERENCE TO RELATED APPLICATION

The present application claims the benefit of the filing date of U.S. Provisional Patent Application No. 61/677,182 filed Jul. 30, 2012, the disclosure of which is hereby incorporated herein by reference.

BACKGROUND

Automatic control devices are used to control the operation of various machines and devices in a data center. In operation, some control devices output control signals, causing motors of controlled devices to turn, valves to open, or circuit boards to power up. In some instances, the system boards of the control devices may lack sufficient facilities for generating the control signals on their own. For this reason, they may use another type of control device, an interface device, to generate and receive signals on their behalf. By using specialized circuitry, the interface devices may generate signals having a specified voltage, current, frequency, or another characteristic, which other control devices cannot by themselves produce.

In general, each interface device may perform at least one of two functions. The interface device may relay control signals whose values are determined by other control devices, and also the interface device may determine the values of control signals by itself. Both functions may be implemented in software. In addition, the functions of control devices that feed control signals to the interface devices may also be implemented in software.

When software running on a control device is updated, special care needs to be taken to prevent the introduction of software bugs. Software updates, over the course of their development, may be tested for compliance with only some of many possible software versions that are running on interface devices (and other control devices) in a data center. Installing, on a control device, a software update that has not been tested for compliance with software running on an interface device connected to the control device may interfere with the proper operation of both the control device and the interface device. The interference may be due software bugs in either one of the two devices. A consequence of the interference may be a loss of control over a data center component that is controlled using the two devices.

SUMMARY

In one aspect, a method is provided for updating software in a system for controlling the operation of a cooling device in a data center. The method includes detecting an event triggering an installation of a first update to software that is executing on a control device. The method further includes, identifying an interface device that connects the control device to the cooling device. The interface device is configured to relay a control signal that is transmitted by the control device to the cooling device. The interface device is identified in response to the event. The method further includes identifying, with a processor, a second update to software that is executing on the interface device, and installing the first update and the second update on the control device and the interface device, respectively. The interface device is connected directly to the cooling device and the first control device is coupled to the interface device.

The control signal may further be a signal that changes a rate at which the cooling device cools equipment in a server rack. Identifying the second update may further include consulting a data record that indicates whether the first update is compatible with the second update. The second update may further be associated with a release date. Identifying the second update may further include selecting the second update over another update based on the release date. Installing the second update may further include replacing the software executing on the interface device. Alternatively, installing the second update may further include patching the software executing on the interface device. In some instances, the method may further include receiving an identifier that is indicative of a hardware configuration of the interface device. The second update may further be identified based on the received identifier.

In another aspect, a method is provided for updating software in a data center control system. The method includes detecting an event triggering an installation of a first update to software that is executing on a first control device. The method further includes, identifying a second control device that is located downstream from the first control device on a transmission path used to deliver control signals transmitted in a downstream direction by the first control device towards a data center component. The method further includes identifying, with a processor, a second update to software that is executing on the second control device, and installing the first update on the first control device and the second update on the second control device.

The second control device may further be an interface device. The data center component may further be one of a cooling device or a power backup system. The first control device and the second control device may further be coupled in series to the data center component. The second control device may further be located between the first control device and the second control device. The data center component may further be a device for controlling a temperature of one or more servers in the data center. The data center component may further be a device for providing power to one or more servers in the data center. The data center component may further be a lighting system for illuminating at least a portion of the data center. The second update may further be associated with a release date. Identifying the second update may further include selecting the second update over another update based on the release date. Identifying the second update may further include consulting a data record that indicates whether the first update is compatible with the second update.

In yet another aspect, a method is provided for updating software in a data center control system. The method includes detecting, with a processor, an event triggering an installation of a first update to software that is executing on a first control device. The method further includes installing a second update on a second control device. The second control device is located, together with the first control device, on a transmission path used to deliver a control signal to a data center component. The second update is installed in response to the event. The second update is an update to software that is executed on the second control device. The control signal is a signal that causes the data center component to transition from one operational state to another operational state.

The data center component may further be one of a cooling device and a power backup system. The data center component may further be a device for controlling a temperature of one or more servers in the data center. The data center component may further be a device for providing power to one or more servers in the data center. The data center component may further be a lighting device for illuminating at least a portion of the data center. In some instances, the method may further include identifying the second update by consulting a data record that indicates whether the first update is compatible the second update.

In yet another aspect, a data center is provided that includes a first data center component, a second data center component, a managing device, a first interface device, a second interface device, and a server. The first interface device is coupled to the first data center component and the managing device. The first interface device is configured to relay a first control signal generated by the managing device to the first data center component. The second interface device is coupled to the second data center component and the managing device. The second interface device is configured to relay a second control signal generated by the managing device to the second data center component. The server is configured to detect an event triggering an installation of a first update to software executing on the managing device, identify a second update to software executing on the first interface device, identify a third update to software executing on the second interface device, the third update being different from the second update. The server is further configured to install the first update, the second update, and the third update on the managing device, the first interface device, and the second interface device, respectively.

The first interface device may further be configured to generate a first analog signal in response to one or more messages received over a digital connection with the managing device. The one or more messages may constitute the first control signal. The first data center component may further be a cooling device and the second data center component may further be a battery backup system. The second update may further include consulting a data record that indicates whether the first update is compatible with the second update.

BRIEF DESCRIPTION OF THE DRAWINGS

FIG. 1 depicts a schematic diagram of a data center in accordance with aspects of the disclosure.

FIG. 5A depicts a state machine diagram for the control system of FIG. 2A in accordance with aspects of the disclosure.

FIG. 6 depicts a schematic diagram of a server from updating one or more control devices in the control system of FIG. 2A in accordance with aspects of the disclosure.

FIG. 8A depicts a flowchart of a process related to the process of FIG. 7.

FIG. 8B depicts a flowchart of another process related to the process of FIG. 7.

DETAILED DESCRIPTION

Figure 2A:
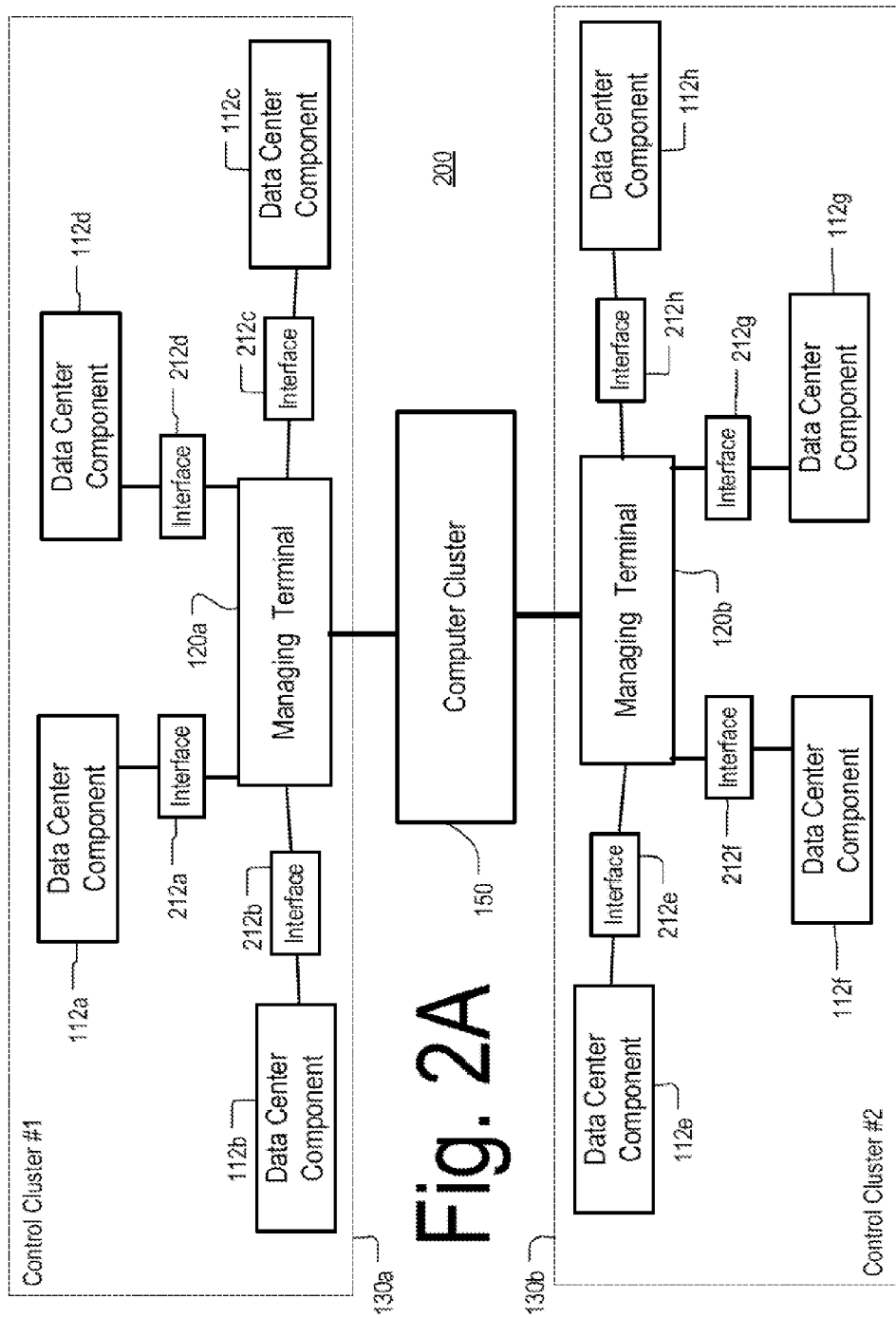
FIG. 2A depicts a control system used to operate the data center of FIG. 1.

FIG. 1 depicts a schematic diagram of a data center 100 in accordance with aspects of the disclosure. The data center 100 may include server racks 110a-f, managing terminals 120a-b, data center components 112a-h, a communications network 140, a computer cluster 150, and an update server 160. Each of the server racks 110a-f may include a plurality of servers. Each of the servers in a given rack may include one or more processors, memory and other components typically found in computer equipment. The computer cluster 150 may be a computer cluster, a computer grid, or another similar system. The components 112a-h may include systems needed for the operation of the data center 100, such as cooling systems (e.g., air conditioners and water chilling systems), battery backup systems, power conversion systems, or lighting systems. In the present example, the cooling system components may be cooling devices, such as server rack cooling units, air conditioners, water chillers, heat exchangers or other devices used in maintaining the temperature of the data center 100 or individual equipment, such as server cases, server racks, or switches. The components in the group 112a-h may be different types of components, or alternatively, they may be the same type of component.

The computer cluster 150, in some aspects, may include servers from the server racks 110a-f. The communications network 140 may connect the computer cluster 150 to the managing terminals 120a-b. The network 140 may include a TCP/IP network, Ethernet, InfiniBand, or other type of network. The components 112a-h may be organized into control groups. As shown, the components 112a-d may be part of the control group 130a and the components 112e-h may be part of the control group 130b. The components in the control group 130a may be controlled using the managing terminal 120a, and the components in the control group 130b may be controlled using the managing terminal 120b. Dividing the management of the data center 100 into control groups may increase the efficiency and scalability of the data center 100.

The update server 160 may include hardware and/or software for updating software that is executing on one or more control devices in the data center 100. Such control devices, may be servers from the computer cluster 150, the managing terminals 120a-b, and the interface devices 212a-h that are shown in FIG. 2A. Although the update server 160 is depicted as a separate block, in other examples, the update server 160 may be integrated into another device, such as one of the managing terminals 120a-b or the control cluster 150.

FIG. 2A depicts a schematic diagram of a control system 200 that may be used to control the components of the data center 100. The control system 200 may include the computer cluster 150, the managing terminals 120a-b, and interface devices 212a-h. The control system 200 may control the operation of the components 112a-h by using control signals. The control signals may be any type of signal that is capable of causing at least one of the components 112a-h to transition from one operational state to another. The control signals may be used to activate or stop actuators, close or open electrical switches, set modes of operation, increase the speed at which fans spin, etc. Moreover, in one particular example, control signals exchanged between various control devices may specify constraints on the operation of a set of data center components. For example, a control signal transmitted by the computer cluster 150 to the managing terminal 120a may specify the maximum amount of power consumed by the data center components 112a-d be 110 Kwh. In response to such a signal, the managing terminal 120a may operate the components 112a-d in a manner that causes them to stay under the power consumption limit. By way of example, the control signals may be analog signals or digital signals, such as bit strings or character strings. Further examples of control signals and their use are provided in the discussion with respect to FIGS. 5A and 5B.

Control signals may be delivered to the components 112a-h via the interface devices 212a-h. By using circuitry, such as digital-to-analog converters (DACs), the interface devices 212a-h may produce analog signals having a specified voltage, current, frequency, or other characteristic, which the computer cluster 150 or the managing terminals 120a-b cannot by themselves produce. Thus, in one aspect, the interface devices 212a-h may be configured to relay control signals generated by the managing terminals 120a-b, or the computer cluster 150, to the components 112a-h. Furthermore, in another aspect, the interface devices 212a-h may be configured to generate the control signals themselves. The latter feature permits the interface devices 212a-h to take control over data center components when a failure in the data center 100 occurs, such as a loss of connectivity between the interface devices and the managing terminals. The functionality of the interface devices may be implemented in software, such as the interface software 414 shown in FIGS. 3 and 4.

Figure 2B:
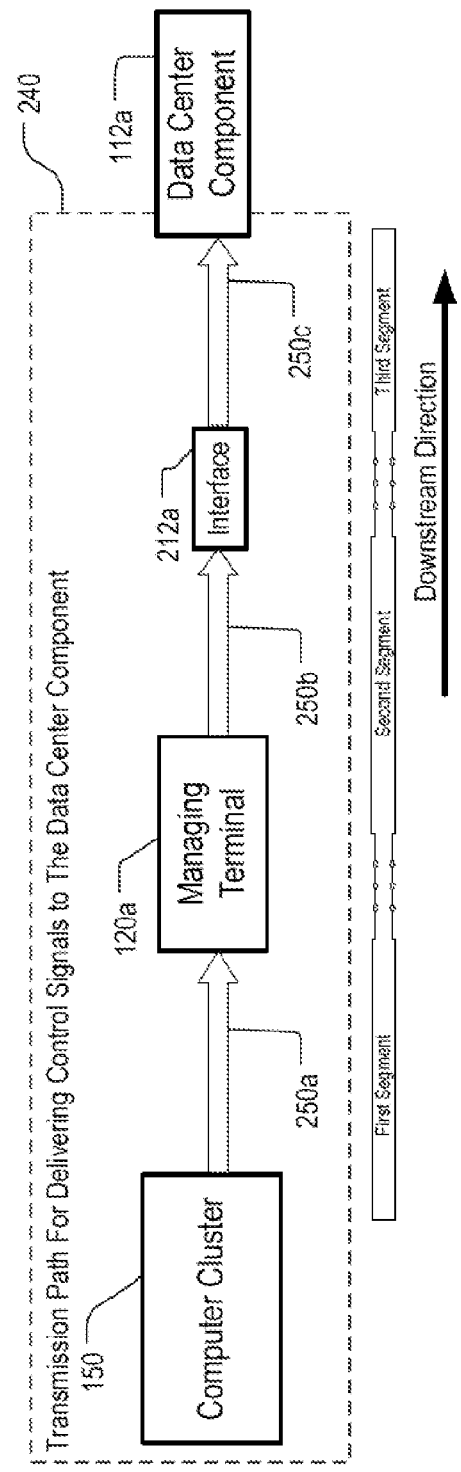
FIG. 2B depicts a schematic diagram of a portion of the control system of FIG. 2A in accordance with one aspect of the disclosure.

FIG. 2B depicts a portion of the control system 200. Shown are the computer cluster 150, the managing terminal 120a, the interface device 212a, and the data center component 112a. As illustrated, the computer cluster 150, the managing terminal 120a, and the interface device 212a are connected in series to the data center component 112a. Specifically, the computer cluster 150 is connected to the managing terminal 120a via a connection 250a, the managing terminal 120a is connected to the interface device 212a via a connection 250b, and the interface device 212a is connected to the data center component 112a via a connection 250c.

The connection 250a may be a network connection (e.g., connection implemented using the network 140), data bus connection (e.g., serial, USB, FireWire, BATA, or parallel), analog connection, or other type of connection. The connection 250b may be a network connection, a data bus connection, an analog connection, or other type of connection. The connection 250 may be a network connection, data bus connection, analog connection, or other type of connection. In this example, the connection 250a may be a network connection, the connection 250b may be USB connection, and the connection 250c may be an analog connection. Although in this example, connections 250a, 250b, and 250c are all different types of connections in other examples, some or all of them may be the same type of connection (e.g., network connection).

Transmission path 240 is a path over which control signals are transmitted, in a downstream direction, to the data center component 112a. As illustrated, the transmission path 240 may include the computer cluster 150, the managing terminal 120a, the interface device 112a, as well as the connections 250a-c. In this example, the transmission path includes three segments. The first segment may span between the computer cluster 150 and the managing terminal 120a and it may be implemented using the connection 250a. The second segment may span between the managing terminal 120a and the interface device 212a and it may be implemented using the connection 250b. The third segment may span between the interface device 212a and the data center component 112a and it may be implemented using the connection 250c.

In one aspect, when a control signal is transmitted along the transmission path 240 in the downstream direction, the control signal, in some instances, may assume different protocol modalities. For example, a control signal originating from the computer cluster 150 may be a TCP/IP message when traversing the first path segment, a USB message when traversing the second path segment, and an analog wave when traversing the third segment. Similarly, a control signal originating from the managing terminal 120a may be a USB message when traversing the second segment and an analog wave when traversing the third segment.

In another aspect, when a control signal is transmitted in a downstream direction along the transmission path, it may assume different semantic modalities. For example the control cluster 150 may transmit a control signal to the managing terminal 120a instructing the managing terminal to limit the power consumption of all devices in the control cluster 130a to 110 KWh. In response, the managing terminal 120a may transmit a control signal instructing the interface device 212a to spin a fan of the data center component 112a at 3500 rpm. Spinning the fan at 3500 rpm, and not more, may be necessary in order to keep the combined power consumption of the cluster 130a under the specified limit. In response to receiving the instruction, the interface device 212a may generate and output a 13.3V DC signal to the fan of the component 112a, wherein the 13.3V DC is the voltage needed to keep the fan spinning at 3500 rpm.

In yet another aspect, feedback signals generated by the data center component 112a (e.g., temperature readings, error codes) may be transmitted in an upstream direction along the transmission path. For example, the interface device 212a may forward any signals it has received from the component 112a to the managing terminal 120a. The managing terminal 120a may in turn forward the feedback signals to the computer cluster 150. The feedback signals may be used, at least in part, by the cluster software 454, terminal software 424, and the interface software 414 (all shown in FIG. 4) as a basis for the generation of control signals. The feedback signals may be used to determine the constraints and/or signal characteristic values that may be part of the control signals. Moreover, feedback signals generated by each one of the components 112a-h may be forwarded towards the computer cluster 150 in the manner described above.

Figure 3:
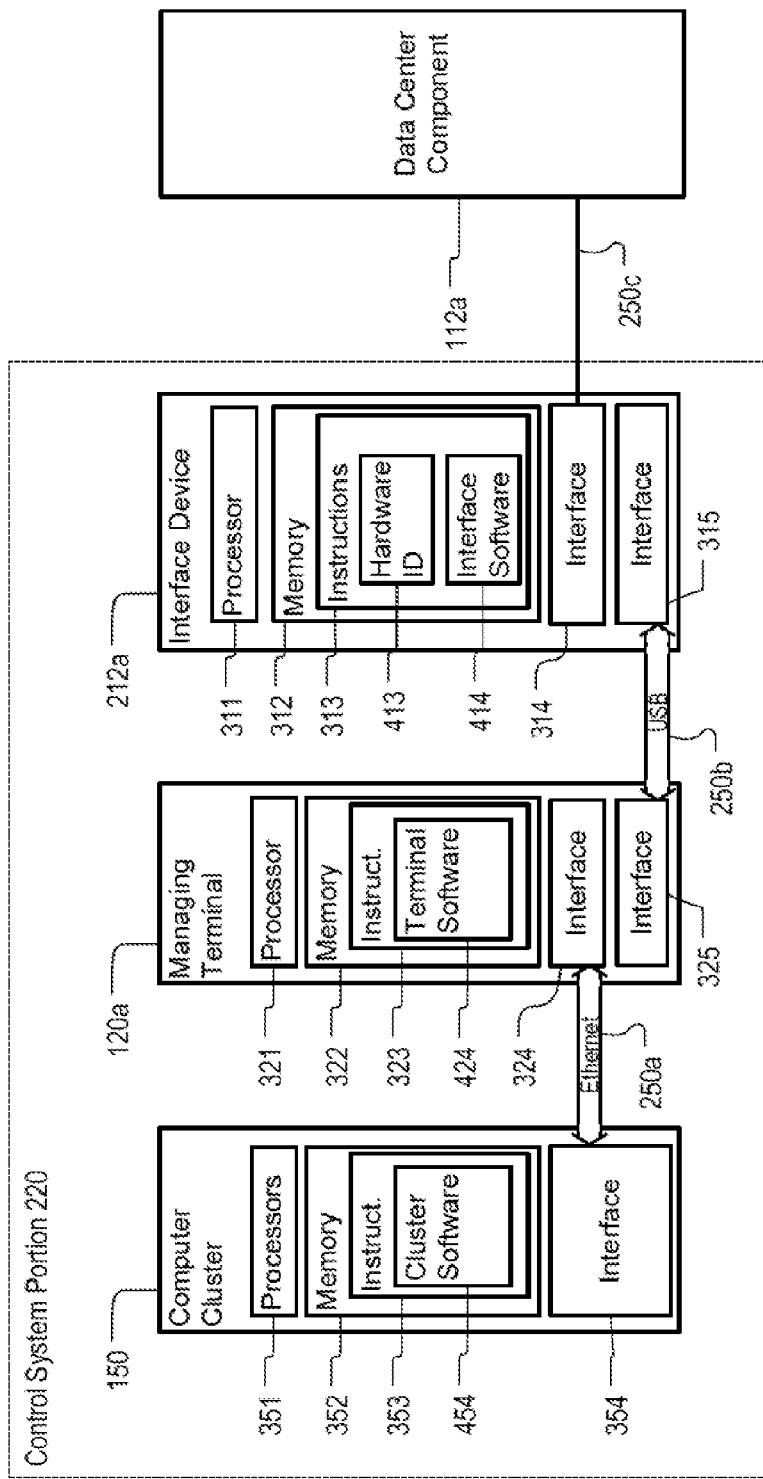
FIG. 3 depicts a schematic diagram of a portion of the control system of FIG. 2A in accordance with another aspect of the disclosure.

FIG. 3 depicts a diagram of the portion of the control system 200 of FIG. 2B in accordance with one example. Shown are computer cluster 150, managing terminal 120a, and interface device 212a coupled to data center component 112a. In this example, the computer cluster 150 may include one or more processors 351, memory 352 and other components typically present in computing devices. The processors 351 may include any well-known processors, such as commercially available processors or dedicated controllers such as an ASIC. The processors 351 and the memory 352 may be distributed across a plurality of servers that are part of the data center 100. The servers may be configured to operate in a computer grid, a distributed computer system, or any other system for distributed computing and/or provisioning of computing resources.

Memory 352 of the computer cluster 150 may store information accessible by the processors 351, including instructions 353 that may be executed by the processors 351. Memory 352 may also include data (not shown) that may be retrieved, manipulated or stored by the processors. The memory may be of any type capable of storing information accessible by the processors 351, such as a hard-drive, memory card, ROM, RAM, DVD, CD-ROM, write-capable, etc. The instructions 353 may be any set of instructions to be executed directly (such as machine code) or indirectly (such as scripts) by the processor. The instructions may be stored in object code format for direct processing by the processor, or in any other computer language including scripts or collections of independent source code modules that are interpreted on demand or compiled in advance. In that regard, the terms "instructions," "steps" and "programs" may be used interchangeably herein. In some aspects, the instructions 353 may include cluster software 454 for controlling the operation of the components 112a-h. The cluster software 454 is further discussed with respect to FIG. 4.

Interface 354 may include a plurality of network adapters for connecting servers in the computer cluster 150 to each other. In addition, the interface 354 may connect the computer cluster 150 to the managing terminal 120a via the connection 250a. The interface 354 may be an Ethernet interface, a Wifi interface, an InfiniBand interface, or any other wired or wireless interface for exchanging communications. In the present example, the interface 354 may be an Ethernet interface.

The managing terminal 120a may be a general purpose computer including a processor 321, memory 322, instructions 323, interface 324, and another interface 325. The processor 321 may include any well-known processor, such as commercially available processors. Alternatively, the processor may be a dedicated controller such as an ASIC. Memory 322 may store information accessible by the processor 321, including instructions 323. The memory 322 may be of any type capable of storing information accessible by the processor, such as a hard-drive, memory card, ROM, RAM, DVD, CD-ROM, write-capable memories, etc. The instructions 323 may be any set of instructions to be executed directly (such as machine code) or indirectly (such as scripts) by the processor. In some aspects, the instructions 323 may include terminal software 424 for controlling the operation of one or more data center components. The terminal software 424 is further discussed with respect to FIG. 4.

The interface 324 may be a Bluetooth, USB, Ethernet or 802.11 adapter, or any other wired or wireless interface for exchanging communications. Similarly, the interface 325 may be a Bluetooth, USB, Ethernet or 802.11 adapter, or any other wired or wireless interface for exchanging communications. In the present example the interface 324 may be an Ethernet interface and the interface 325 may be a USB interface.

Interface device 212a may include a processor 311, memory 312, interface 314 for connecting to interface 325, and interface 315 for connecting to the data center component 112a. The processor 311 may be an ASIC, FPGA, or any commercially available processor. The memory 312 may be a PROM, EEPROM, RAM, CD-ROM, or any other type of volatile and non-volatile memory. The instructions 313 may be any set of instructions to be executed directly (such as machine code) or indirectly (such as scripts) by the processor 311. Furthermore, in some aspects, the interface device 212a may be a processor-based system including an Atmel ATmega32u4 microcontroller, 500 bytes of RAM, 16 k flash memory and powered by 5V power supply at 20 mA. In that regard, the interface device 212a may have less processing power than the managing terminal 120a.

The memory 312 may include interface software 414 for controlling the operation of the data center component 112a. The interface software 414 may be executed directly on the hardware of the interface device 212a, or alternatively, the software 414 may be executed on top of other software, such as an operating system. Stated succinctly, the interface software 414 may be any set of one or more processor executable instructions that are stored in an EEPROM, RAM, flash memory, or any other type of memory that is part of the interface device 212a and executed by the processor 311.

Furthermore, the memory 312 may include hardware ID 313. Hardware ID 413 may be an identifier of hardware configuration of the interface device 212a. The hardware ID 413 may be a serial number, manufacturer's ID, or another number or string that is indicative of one or more aspects of the hardware configuration of the interface device 212a. Specifically, the hardware ID 413 may be indicative of a make or model of a microcontroller or another integrated circuit that is part of the interface device 212a (e.g., a network interface chip). Similarly, the hardware ID 413 may be indicative of a make or model of a system board, or another board that is part of the interface device 212a. The hardware ID 413 may be stored on an EEPROM chip located on a system board of the interface device 212, but it other examples it may be located elsewhere on the interface device 212a.

The interface 315 may include software and hardware for transmitting and receiving analog signals, such as a digital-to-analog converter (DAC) or analog-to-digital converter (ADC). Alternatively, the interface 315 may include a One-Wire, I2C, SPI, USB, Bluetooth, Ethernet or 802.11 adapter, or any other wired or wireless interface for exchanging communications. Similarly, the interface 314 may be a Bluetooth, USB, Ethernet or 802.11 adapter, or any other wired or wireless interface for exchanging communications. In the present example, the interface 314 may be a USB interface and the interface 315 may be an interface for transmitting and receiving analog signals from the component 112a.

Figure 4:
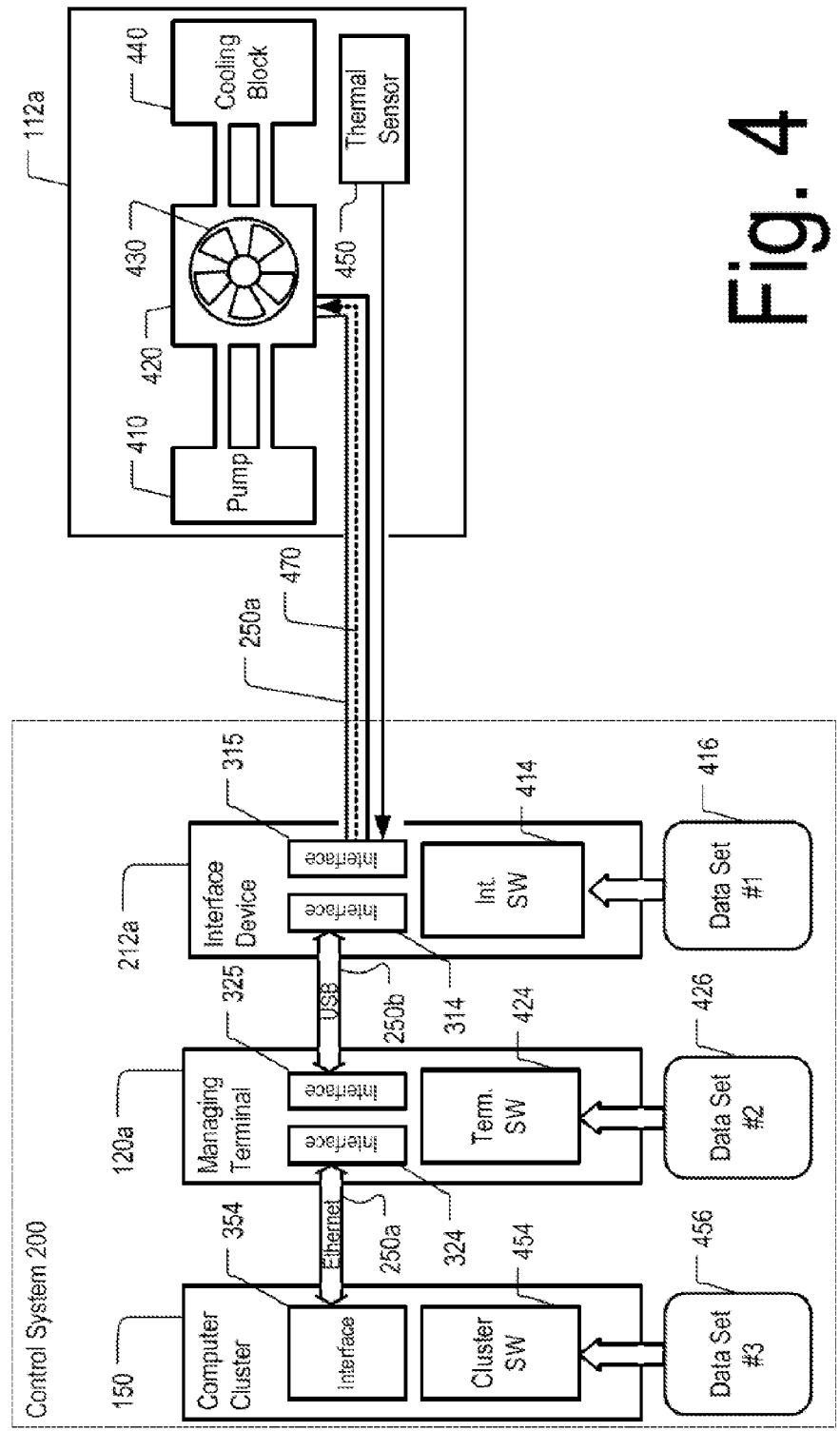
FIG. 4 depicts a schematic diagram of a portion of the control system of FIG. 2A in accordance with yet another aspect of the disclosure.

FIG. 4 depicts a diagram of the portion 220 of the control system 200 in accordance with another example. In this example, the component 112a may be a server rack cooling unit including a pump 410 that circulates coolant through a radiator 420 and cooling block 440. To dissipate heat away from the radiator 420, the component 112a may use a fan 430. The speed of the fan 430 may be varied using the control signal 470 that is fed to the fan 430 by the control system 200.

In one aspect, the control signal 470 may be generated by the interface device 212a. When the control signal 470 is an analog signal, the interface device 212a may use the interface software 414 to determine one or more control signal characteristics, such as voltage, frequency, current flow rate, etc. Alternatively, when the control signal 470 is a digital signal, the interface device 212a may use the interface software 414 to determine a bit string, number, or character string that constitutes the control signal 470. In either instance, the interface device 212a may determine the control signal 470 based on a data set 416. The data set 416 may include the values of one or more feedback signals produced by the component 112a, such as one or more readings from sensors that are part of the component 112a (e.g., the thermal sensor 450), error codes, status updates, or any other information output by the component 112a.

In one example, the interface software 414 may model the speed of the fan 430 as a function of the temperature inside the server rack 110a. For instance, the interface software 414 may set the fan 430 to rotate at 1000 RPM when the thermal sensor 450 indicates that the temperature is 20° C. Upon detecting that the temperature rises, the interface software 414 may increase the fan's speed in order provide adequate cooling to the server rack 110a. The interface software 414 may increase the speed of the fan 430 to 2000 RPM when the temperature measured by the sensor 450 reaches 40° C. In other words, the control logic may vary the speed of the fan 430 by changing one or more characteristics (e.g., voltage) of the control signal 470.

In another aspect, the control signal 470 may be generated by the managing terminal 120a. When the control signal 470 is an analog signal, the managing terminal 120a may use the terminal software 424 to determine one or more control signal characteristics, such as voltage, frequency, current flow rate, etc. Alternatively, when the control signal 470 is a digital signal, the managing terminal 120a may use the terminal software 424 to determine a bit string, digit, or character string that constitutes the control signal 470. In either instance, the managing terminal 470 may determine the signal 470 based on a data set 426. The data 426 set may include some or all information that is found in the data set 416. In addition, the data set 426 may include information not found in the data set 416. For example, the data set 426 may include information about the state of other components in the control group 130a, such as the values of one or more feedback signals from the components 112b-d. The feedback signals may include readings from sensors that are part of the components 112b-d, error codes, status updates, or any other information output by the components 112b-d.

In one example, the terminal software 424 may model the speed of the fan 430 as a function of the state of another one of the components in the control group 130a. For instance, when the component 112b fails, the terminal software 424 may increase the speed of fan 430 to compensate for the component 112b's failure. In that regard, the terminal software 424 may cause the component 112a to carry some of the load of the component 112b when the latter one fails.

In another aspect, the control signal 470 may be generated by the computer cluster 150. When the control signal 470 is an analog signal, the computer cluster 150 may use the cluster software 454 to determine one or more control signal characteristics, such as voltage, frequency, current flow rate, etc. Alternatively, when the control signal 470 is a digital signal, the computer cluster 150 may use the cluster software 454 to determine a bit string, number, or character string that constitutes the control signal 470. In either instance, the control signal 150 may be determined based on a data set 456. The data set may include some or all of the information found in the data sets 416 and 426. In addition, the data set 456 may include information that is not found in the data sets 414 and 426. For example, the data set 456 may include the values of feedback signals from components outside of the control group 130a, such as readings from sensors, error codes, status updates, or other information output by the components 112e-h. Furthermore, the data set 456 may include information about the air temperature outside of a building where the data center 100 is housed, information about the state of the power supplied to the data center 100, or any other information relevant to the operation of the data center 100.

In one example, the cluster software 454 may model the speed of the fan 430 as a function of the state of the power consumed by the data center 100. For instance, if the data center 100 consumes too much power, the cluster software 454 may set the fan 430, together with fans in the components 112b-h, at a lower speed in order to reduce the data center's overall power usage. As another example, the cluster software 454 may vary the speed of the fan 430 as a function of the air temperature outside of the data center 100. For example, if the air temperature is low, the control logic may set the fan 430 at a slower speed than it would otherwise if the air was warmer.

In some aspects, the cluster software 454 may be executed concurrently with other software, such as search engine software or content delivery software. Thus, the computer cluster 150 may have the dual function of executing both software for providing services to outside clients (e.g. Internet search services, video-on-demand services) and software for controlling the operation of components of the data center 100. Moreover, in some instances, in addition to controlling various support systems, the computer cluster may control the operation of servers, switches, and other IT equipment. For example, the computer cluster 150 may bring servers offline and online depending on the rate at which service requests are received at the data center 100.

In some aspects, and at different instances, the interface software 414, the terminal software 424, and the cluster software 454 may generate the control signal 470 based on different data. By way of example, the interface software 414 may generate the control signal 470 based on feedback signals from components controlled by the interface device 212a (e.g., feedback signal from the sensor 450), but not based on feedback signals from other components. The terminal software 424 may generate the control signal 470 based on feedback signals from any of the components in the control group 130a, but not based on feedback signals from components outside of the control group 130a. The cluster software 454 may generate the control signal 470 based on feedback signals from any of the components in the data center 100.

In other aspects, the cluster software 454, the terminal software 424, and the interface software 414 may implement different algorithms for generating the control signal 470. The cluster software 454 may implement algorithms capable of balancing the operation of any of the components in the data center 100 in order to bring the data center 100 into a desired cumulative state. The cumulative state of the data center 100 may be based on the states of any two or more components in the data center 100 that are located in different control groups. Exemplary cumulative states include total power consumption of the components 112a-h, mean power consumption of the components 112c-e, average air temperature in the server racks 110a-f, mean water flow of three or more water cooling systems, average charge rate of two or more battery chargers, average temperature, or any other metric that describes aspects of the operation of two or more components of the data center 100 as a group. For example, a desired cumulative state of the data center 100 may be a state in which the total power consumption of the data center 100 is below a given threshold.

The terminal software 424, by contrast, may execute algorithms capable of changing cumulative states associated only with components in the control group 130a, but not with components outside of the control group 130a. A cumulative state of the control group 130a may be based on the states of any two or more components in the control group 130a. For example, it may be the combined power consumption of the components 112a-d, mean power consumption of the components 112c-d, combined air temperature, mean water flow of three or more water cooling systems, average charge rate of two or more battery chargers, average temperature, or any other metric that describes aspects of the operation of two or more components of the control group 130a as a group. For example, a desired cumulative state of the cluster 130a may be a state in which the total power consumption of the components 112a-d is below a given threshold.

In yet other aspects, the cluster software 454, the terminal software 424, and the interface software 414 may differ in their computational complexity. As noted above, the cluster software 454 may balance the control signals fed to the components 112a-h such as to bring the data center 100 into a desired cumulative state. Keeping track of the cumulative state of the data center 100 and then factoring the states of additional data center components when generating the control signal 470 may be beyond the processing capabilities of the interface device 212a and the managing terminal 120a when the number of the additional data center components is large. The computer cluster 150, which combines the processing power of multiple servers, however may have sufficient resources to perform the above tasks.

In yet other aspects, the interface software 414, the terminal software 424, and the cluster software 454 may differ in their function. For example, the interface software 414 may be adapted to control only one type of data center component (e.g., a cooling device), whereas the cluster software 454 and the terminal software 244 may be adapted to control multiple types of interface devices (e.g., a cooling device and a power backup system).

FIG. 5A depicts a state machine diagram for the control system 200 in accordance with aspects of the disclosure. In this example, the control system 200 changes between states 510, 520, and 530. In the state 510, the computer cluster 150 controls the component 112a. The computer cluster 150 may execute the cluster software 454 to determine the control signal 470. The computer cluster 150 may then transmit the control signal 470 to the managing terminal 120a, which in turn may forward it to the interface device 212a for a subsequent transmittal to the component 112a.

For example, while the control system 200 is in the state 510, the computer cluster 150 may execute the cluster software 454 and determine that a 5V signal should be supplied to the component 112a. The computer cluster may then generate a text message including the string "5V" and transmit the text message over the connection 250a to the managing terminal 120a. The managing terminal 120a, may then forward the text message, over the connection 250b to the interface device 212a. The interface device 212a may produce an analog signal having the voltage specified in the text message and feed the produced analog signal to the component 112a.

The control system 200 may remain in the state 510 until one of a triggering event $T_1$ and a triggering event $T_6$ occurs. The triggering event $T_1$ may include the computer cluster 150 running out of resources to execute the cluster software 454, such as CPU time or memory. Alternatively, the triggering event $T_1$ may include a failure of the computer cluster 150, a failure of the connection between the computer cluster 150 and terminal 120a, or a failure of the cluster software 454. Furthermore, the triggering event $T_1$ may include an expiration of a timer at the managing terminal 120a as a result of the computer cluster 150 failing to transmit a control signal to the managing terminal 120a within a predetermined time period. When the triggering event $T_1$ occurs, the control system 200 may transition into the state 520.

The triggering event $T_6$ may include the component 112a reaching a predetermined state. For example, a predetermined state of the component 112a may be the sensor 450 of the component 112a measuring a temperature of 50° C. thereby indicating that the server rack 110a is beginning to overheat. When the temperature sensor measures the temperature, the control system 200 may transition into a state 530 where the interface device 212a controls the component 112a. In some aspects, the interface software 424 executed by the interface device 212a may be less complex and therefore more reliable than the cluster software 454. This may be especially so when an emergency is taking place. In that regard, when the triggering event $T_6$ occurs, transitioning into the state 530 from the state 510 may increase the reliability of the control system 200.

In the state 520, the managing terminal 120a controls the operation of the component 112a without the participation of the computer cluster 150. While the control system 200 is in the state 520, the managing terminal 120a may determine the control signal 470 using the terminal software 424. The managing terminal 120a may then transmit the control signal 470 to the interface device 212a for a subsequent transmittal to the component 112a. For example, the managing terminal 120a may execute the terminal software 424 and determine that a 7V signal should be supplied to the component 112a. The managing terminal 120a may then produce a text message including the string "7V" and transmit the text message to the interface device 212a. The interface device 212a may produce an analog signal having the voltage specified in the text message and feed the produced signal to the component 112a.

The control system 200 may remain in the state 520 until one of a triggering event $T_2$ and triggering event $T_4$ occurs. The triggering event $T_2$ may include the data center 100 entering a predetermined cumulative state. Moreover, the triggering event $T_2$ may include receiving a message from the cluster software 454 indicating that the cluster software 454 is resuming control over the component 112a. When the triggering event $T_2$ occurs, the control system 200 may transition into the state 510.

The triggering event $T_4$ may include a failure of the managing terminal 120a, a failure of the connection between the managing terminal 120a and the interface device 212a, a failure of the control logic 420, or entering by the component 112a into a predetermined state. Furthermore, the triggering event $T_4$ may include an expiration of a timer at the interface device 212a as a result of the managing terminal 120a failing to transmit a control signal to the interface device 212a within a predetermined time period. When the triggering event $T_4$ occurs, the control system 200 may transition into the sate 530.

In the state 530, the interface device 212a controls the operation of the component 112a without the participation of the computer cluster 150 and the managing terminal 120a. While the control logic 200 is in the state 530, the interface device 212a may use the interface software 424 to determine the control signal 470. The interface device 212a may then feed the control signal 470 directly into the component 212a.

The control system 200 may remain in the state 530 until triggering event $T_3$ or a triggering event $T_5$ occurs. The triggering event $T_3$ may include the control group 130a reaching a predetermined cumulative state. The cumulative state may be a state marked by excessive power usage by the components 112a-d. In some aspects, the managing terminal 120a may monitor the control group 130a and detect when the control group 130a enters the predetermined cumulative state. The managing terminal 120a may then transmit a message to the interface device 212a indicating that it is assuming control over the component 112a and causing the control system 200 to enter the state 520. When the control system 200 is in the state 520, the managing terminal 120a may harmoniously coordinate the operation of the components 112a-d in order for them to reach a target for total power consumption, as a group, while each of them continues to serve its purpose to a satisfactory degree by cooling one of the server racks 110a-d. By contrast, the interface device 212a may lack this capability. In that regard, it may be advantageous for the managing terminal 120a to take control over the component 112a when the operation of the control group 130a, as a unitary body, needs adjustment.

The triggering event $T_5$ may include the data center 100 entering a predetermined cumulative state. The predetermined cumulative state may be a state of excessive total power use by the components 112*a-h*. In some aspects, the computer cluster 150 may monitor the data center 100 and detect when the data center 100 enters the predetermined cumulative state. The computer cluster 150 may then transmit a message to the interface device 212*a* indicating that it is assuming control over the component 112*a* and causing the control system 200 to enter the state 510. When the control system 200 is in the state 510, the cluster software 454 of the computer cluster 150 may balance the operation of the components 112*a-h* in a manner that results in them, as a group, beginning to consume less power while each of them continues to maintain its server rack cooled at a safe temperature. Unlike the cluster software 454, the terminal software 424 and the interface software 414 may lack this capability. In that regard, it may be preferable for the computer cluster 150 to take charge of the component 112*a* when the data center 100 enters an undesirable cumulative state, such as this one.

Figure 5B:
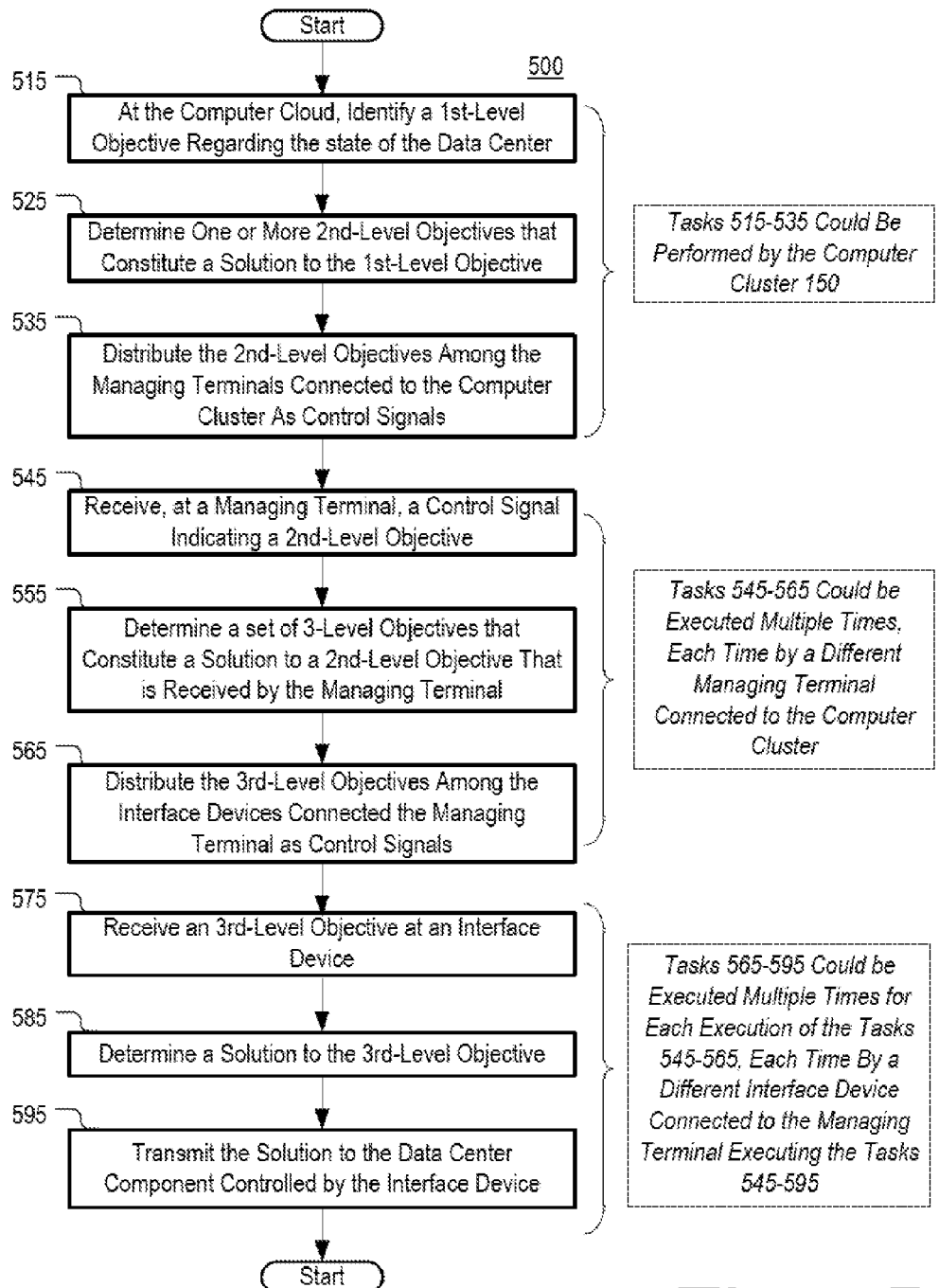
FIG. 5B depicts flowchart of a process performed by the control system of FIG. 2A in accordance with aspects of the disclosure.

FIG. 5B depicts a flowchart of a process 500 associated with the operation of the control system 200 in accordance with another aspect of the disclosure. At task 515, the computer cluster 150 identifies a 1st-level objective regarding the state of the data center 100. In this example, the 1st-level objective may be: "keep the total operating cost of the data center 100 under three thousand and five hundred dollars per hour (3500 dollars/hour)."

At task 525, the computer cluster 150, using the cluster software 454, determines a solution to the 1st-level objective. The solution may come in the form of a set of one or more 2nd-level objectives, such that if each of the 2nd-level objectives is achieved, the 1st-level objective will also be accomplished. For example, the computer cluster 150 may determine that in order to stay within budget, the control clusters 130*a* and 130*b* may consume at most 110 Kwh and 80 Kwh respectively. Thus, "consume at most 110 Kwh" and "consume at most 80 Kwh" may be examples of 2nd-level objectives.

At task 535, the computer cluster 150 transmits the 2nd-level objectives to managing terminals in the data center 100. Each 2nd-level objective may be transmitted to different one of the plurality of control terminals in the data center 100. The 2nd-level objectives may be transmitted in the form of control signals. In this example, the 2-nd level objective "consume at most 110 Kwh" may be transmitted to the managing terminal 120*a* and the 2nd-level objective "consume at most 80 Kwh" may be transmitted to the managing terminal 120*b*.

At task 545, the managing terminals 120*a* and 120*b* receive the control signals transmitted by the computer cluster 150. At task 555, at least one of the managing terminals 120*a-b* determines a solution to its respective 2nd-level objective. The solution may be determined by using terminal software, such as the terminal software 424. The solution may be a set of one or more 3rd-level objectives, such that if each 3rd-level objective in the set is achieved, the 2nd-level objective will also be accomplished. For example, the terminal 120*a* may determine that in order to stay under the allotted power consumption limit and operate its dependent components safely, the following 3rd-level objectives have to be met:

O1: the fan of the data center component 112*a* must rotate at 3500 rpm,
O2: the fan of the data center component 112*b* must rotate at 2700 rpm,
O3: the fan of the data center component 112*c* must rotate at 2300 rpm, and
O4: the fan of the data center component 112*d* must rotate at 2500 rpm.

At task 565, at least one of the managing terminals 120*a-b* transmits one or more of the 3rd-level objectives it has determined at task 555. The 3rd-level objectives may be transmitted to one or more of the interface devices connected to the managing terminal that is executing the transmission. For instance, each 3rd-level objective generated by the managing terminal 120*a* may be transmitted to a different one of the interface devices 212*a-d* that are connected to the managing terminal 120*a*. The 3rd-level objective O1 may be transmitted to the interface device 212*a*, the 3rd-level objective O2 may be transmitted to the interface device 212*b*, the 3rd-level objective O3 may be transmitted to the interface device 212*c*, and the 3rd-level objective O4 may be transmitted to the interface device 212*d*. Each 3rd-level objective may be transmitted as a control signal.

At task 575, at least one of the interface devices 212*a-h* receives a control signal transmitted by its supervisory managing terminal. The control signal, as noted above, may indicate a 3rd-level objective. At task 585, at least one of the interface devices 212*a-h* determines a solution to the 3rd-level objective that it has received at task 575. The solution may be determined by using interface software, such as the interface software 414. The solution determined by each interface device may come in the form of a control signal, which when supplied to the data center component that is controlled with the interface device, causes the data center component to accomplish the $3^{rd}$-level objective. For example, the interface device 212*a* may determine that in order to spin the fan 430 at 3500 rpm, the interface device 212*a* has to output a 13.3V signal to the fan (that signal may be used to power the fan).

Alternatively, the interface device 212*a* may determine that in order to spin the fan 430 at 3500RPM, the interface device 212*a* needs to output the control code "0101" to a controller of the fan 430. At task 595, each of the interface devices outputs a signal that is determined at task 585 to the data center component controlled by the interface device.

As noted above, each one of the 1st-level, 2nd-level, and 3rd-level objectives may specify a constraint on the operation of a set of one or more data center components. The constraints may require that the set of data center components operate in a manner such that the amount of resources consumed by the group is under/over a threshold, amount of heat output is under/over a threshold, amount of work performed is under/over a threshold, amount of light produced is under/over a threshold, amount of cooling produced is under/over a threshold, cost of operation is under/over a threshold, cooling water flow is under/over a threshold, efficiency. In other words, the constraint may pertain to any conceivable aspect of the operation of one or more data center components.

In one aspect, each subsequent level of objective may specify a constraint on the operation of a sub-set of the data center components governed by a higher-level associated objective. For example, the 1st-level objective may specify a constraint on the operation a set of data center components (e.g., all components of the data center 100). Each of the 2nd-level objectives may specify a constraint on different subsets of the set of the components in the set governed by the 1st-level objective (e.g., different control clusters). Similarly, each of the 3rd-level objectives that correspond to a given 2nd-level objective may place a constraint on a subset of the subset controlled by the 2nd-level constraint (e.g., an individual data center component found in a control cluster.). Although in this example three levels of objectives are used, in other examples any number of objectives may be utilized instead.

Notably, in another aspect, all three control devices may control the data center component 112*a* concurrently and in concert. The interface device 212*a* may have the fastest response time of all three control devices and it may be able to adjust the operation of the component 112a at a rate of many times per minute (e.g, 20 Hz). By contrast, the managing terminal 120a may have a slower response time than the interface device because it may have to process a larger data set (e.g., data set 426) than individual devices. The managing terminal may just be able to adjust the operation of the data center component 112a just a few times per minute (e.g., 0.1 Hz). The computer cluster 150 may have an even slower response rate. Because the computer cluster 150 may process data related to tens of thousands devices in a data center, the computer cluster 150 may be able to adjust the operation of the component 112a just once every few minutes. In that regard, the computer cluster 150 may specify various 2nd-level objectives for the different managing terminals in the data center 100 and then a period of time may pass before the 2nd-level objectives are updated. Each managing terminal may update the 3rd-level objective pursued by one or more interface devices several times during that period. Once a 3rd-level objective for a given data center component is specified, that objective may be pursued independently by the interface devices connected to the data center component until the 3-rd level objective is updated.

Figure 5C:
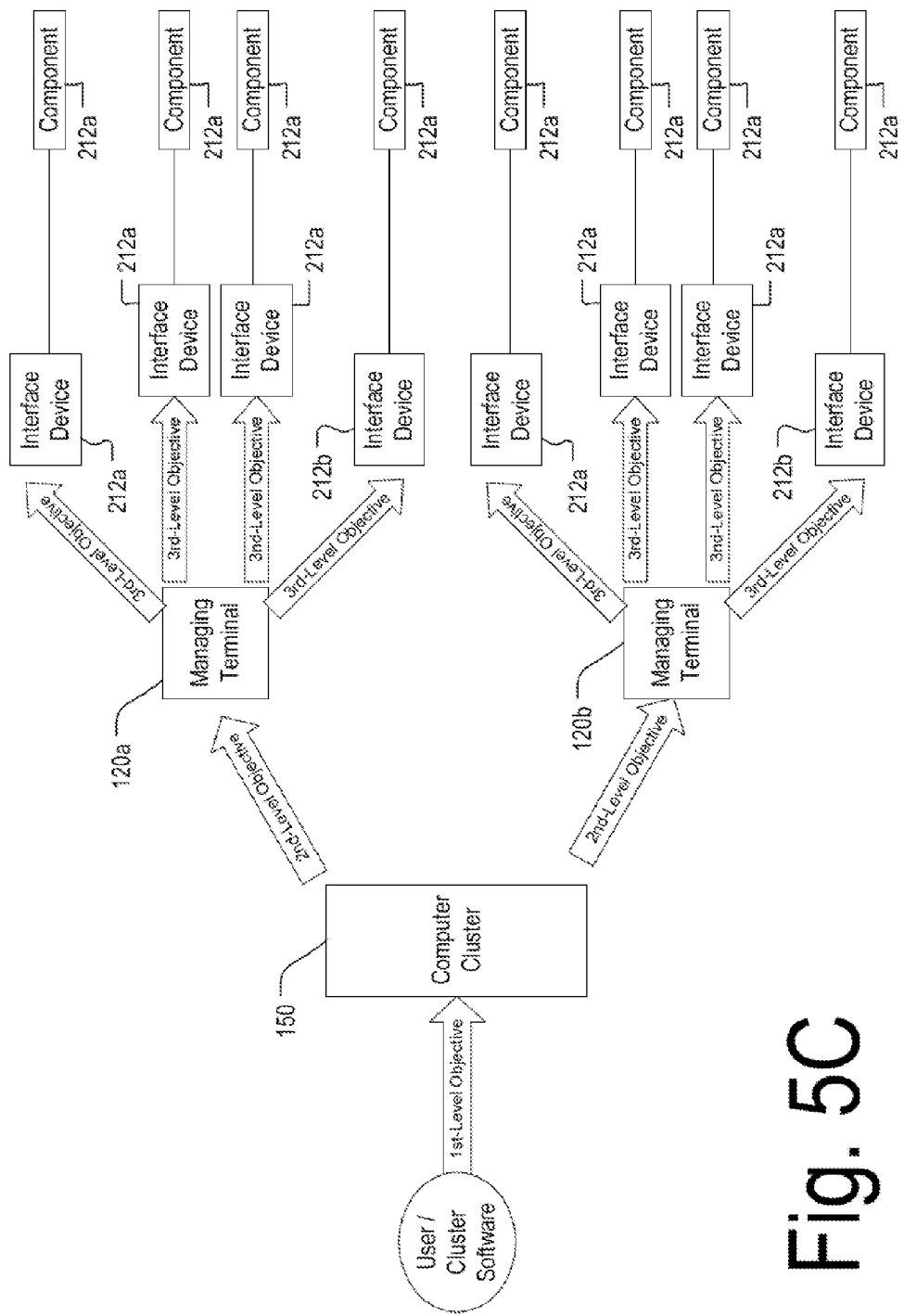
FIG. 5C depicts a schematic diagram illustrating the flow of data within the control system 200.

FIG. 5C illustrates the flow of control data in the control system 200. As illustrated different control signals may flow between different elements of the system. Each of the control signals may identify a constraint on the operation of one or more of the components 112a-h (e.g., "rotate at 3500 rpm", "control cluster should consume less than a predetermined amount of power") or alternatively, each control signal may identify a characteristic of a signal that is to be supplied to one or more of the data center components (e.g., 13.3V DC). When a control device (e.g., computer cluster, managing terminal, or interface device) is provided with a constraint, the control device may determine how to satisfy the constraint. For example, the control device may identify a characteristic of a signal which when supplied to a component will cause the component to meet the constraint (e.g., logic-value, voltage, frequency). Alternatively, the control device may derive a set of one or more additional constraints, which, if met, may cause the original constraint to also be met. Each additional constraint may be transmitted further downstream on one or more transmission paths leading to various data center components.

In one aspect, each control device (e.g., computer cluster, managing terminal, and interface device) may micromanage individual data center components. For example, the computer cluster may determine the voltage used to power the fan 430. In other aspects, higher-level control devices may determine various constraints, and only the interface devices may micromanage individual data center components by determining the exact value of an analog signal or a digital code that is supplied to the individual data center components. In that regard, the control system 200 may employ a combination of the techniques described with respect to FIGS. 5A and 5B.

As illustrated with respect to FIGS. 5A and 5B, the cluster software 454, the terminal software 424, and the interface software 414 may interact with each other when controlling the operation of the data center 100. Accordingly, the cluster software 454, the terminal software 424, and the interface software 414 need to be compatible with one another. When two bodies of software, such as the software 414 and the software 424, are incompatible, one of them may not be capable of properly interpreting, processing, executing, or otherwise utilizing information received from the other software.

For example, when the interface software 414 and the terminal software 424 are incompatible, the interface software 414 may not be able to correctly interpret messages containing control signal values and it may output incorrect control signals to the data center component 212a as a result. As another example, when the terminal and interface software are incompatible, the interface software 414 may not correctly execute instructions to relinquish control over the data center component 112a. In general, incompatibilities between the software 414 and 424 may be due to software bugs in one or both of them.

Updating any software from the group of cluster software 454, the terminal software 424, and the interface software 414 may cause that software to become incompatible with the other software from the group. By way of example, when updates to the terminal software 424 are developed, they undergo a process of a quality assurance and in this process they may be tested for compliance with the interface software 414. The updates, for example, may be tested for compliance with only one version of the interface software 414 (e.g., the most recent). However, in instances where multiple versions of the interface software 414 exist, the compatibility between the update to the software 424 and other versions of the interface software 414 may be unknown and untested. If an update to the software 424 is installed that is not tested for compliance with the version of the interface software 414 that is currently being executed by the interface device 212a, software bugs may appear, and the normal operation of the control system 200 may become compromised.

In some aspects, the server 160 may help ensure compatibility between the software running on different control devices in the same transmission path 240 when an update is installed. FIG. 6 depicts a schematic diagram of the server 160. As illustrated, the update server 160 may include one or more processors 610, memory 620, and other components typically present in computing devices. The processor 610 may include any well-known processors, such as commercially available processors or dedicated controllers such as an ASIC. Memory 620 stores information accessible by the processor 610, including instructions 640 that may be executed by the processor 310. The memory also includes data 630 that may be retrieved, manipulated or stored by the processor. The memory may be of any type capable of storing information accessible by the processor, such as a hard-drive, memory card, ROM, RAM, DVD, CD-ROM, write-capable, and read-only memories.

Data 630 may be retrieved, stored or modified by processor 610 in accordance with the instructions 640. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

The instructions 640 may be any set of instructions to be executed directly (such as machine code) or indirectly (such as scripts) by the processor. In that regard, the terms "instructions", "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 630 may include a table 632 having one or more rows, wherein each row relates an identifier of a hardware configuration of a control device, such as the hardware ID 413, to an identifier for interface software that is compatible with the identified hardware configuration. The identifier of the hardware configuration may be a serial number, manufacturer's ID, or any other number or string that is indicative of one or more aspects of the hardware configuration of the interface device. In some aspects, the table 632 may be used in identifying updates that are compatible with the hardware configuration of one or more interface devices. Table 1 below depicts an example of content that may be found in the table 632.

TABLE 1

Example of Table 632

| Hardware ID | Interface Software |
|---|---|
| interface_1a | interface_sw_1a.img |
| interface_1b | interface_sw_1b.img |
| interface_1c | interface_sw_1c.img |
| interface_1d | interface_sw_1d.img |

Data 630 may further include a table 634 that is used to identify interface device software that is deemed compatible with a specific software update. The table 634 may include one or more rows, wherein each row relates an identifier for an update to the terminal software 424 to an identifier for an update to the interface software 414 that is deemed compatible with the identified update to the terminal software 424. The terminal software update identifier may be any number or alphanumeric string, such as a file name, version number or any other identifier capable of being used in identifying a terminal software update. The interface update identifier may be any number or alphanumeric string, such as a file name, version number or any other identifier capable of being used in identifying an update to the interface software 414. Table 2 below depicts an example of content that may be found in the table 634.

TABLE 2

Example of Table 634

| Interface Software | Terminal Software ID |
|---|---|
| interface_sw_1a.img | upgrade_1 |
| interface_sw_1b.img | upgrade_2 |
| interface_sw_1c.img | upgrade_3 |
| interface_sw_1d.img | upgrade_4 |

Tables 632-634 may each be represented as a database table, a binary file, a text file, or any other file of data structure suitable for relating information in the manner discussed above. Although the tables 632-634 are depicted in FIG. 6 as being separate, in some examples the tables 632 and 634 may be integrated together. The data 630 may further include a update storage 636 which is a file system directory or a software repository from which or more updates to the terminal software 424 may be retrieved. Similarly, the firmware storage 638 may be a file system directory or a software repository from which one or more updates to the interface software 414 may be retrieved. Each of the updates stored in the repositories may be associated with release dates.

Although in this example the tables 632-634 are stored in the memory of server 160, in other examples the information stored in tables 632-634 may be stored at a location other than the server 160. Similarly, the update storages 636-638 may be situated at another location. Although in the above example, the sever 160 is not connected directly to the interface device 2122a, in other examples, the server 160 may be directly connected to the interface device via the network 140.

Figure 7:
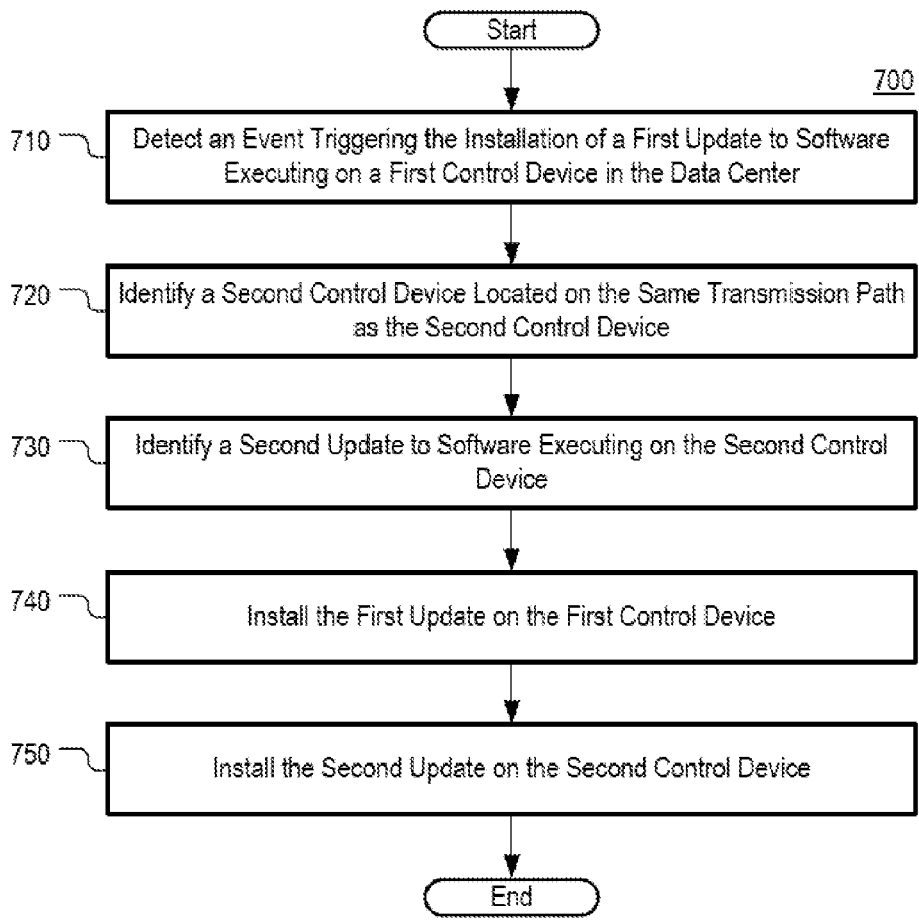
FIG. 7 depicts a flowchart of a process in accordance with aspects of the disclosure.

FIG. 7 depicts a flowchart of a process 700 associated with installing a first software update on a first control device in the data center 100. At task 710, an event triggering the installation of a first update to software running on a first control device is detected. The event may be the receipt of an instruction to install the update. The instruction may be contained in a message received from a remote system such as the managing terminal 120a or, alternatively, the instruction may be received from an input device, such as a keyboard or mouse. Alternatively, the event may be the expiration of a timer, or another event that is generated automatically by software executing on the device performing the process 400 (e.g., the update server 160). Furthermore, as another alternative, the triggering event may be the detection that a new interface device (e.g., the interface device 212a) has been connected to the managing terminal 120a (e.g., plugged into a USB port of the managing terminal). The first update may be a different version (e.g., newer or older) of the software that is executing on the first control device (e.g., software 424) at the time when the event is detected. Alternatively, the first update may be entirely different software capable of performing one or more of the functions of the software executing on the first control device at the event is detected. In some aspects, the first update may include all the files need to install the software from scratch (e.g., the first update may be an installation image) or alternatively, the first update may be a software patch that is usable to modify already installed code. The first control device that may be any one of the interface device 212a, the managing terminal 120a, and the computer cluster 150. In this example, the first control device is the managing terminal 120a and the first update is an update to the software 424.

At task 720, a second control device is identified that is located on the same transmission path (e.g., transmission path 240) as the first control device. The second control device may be any one of the computer cluster 150, the managing terminal 120, and the interface device 212a. In this example, the interface device 212a is identified as the second control device.

In one aspect, the second control device may be identified using a map, or another data structure, that indicates the topology (or portion thereof) of the control system 200 (or just the transmission path 240). Alternatively, the second control device may be identified using a discovery algorithm where a query is submitted by the first control device requesting other control devices on the same transmission path to self-identify. Upon receiving the identification of the second control device, in response to the query, the first control device may forward it to the server 160 or another entity that is executing the process 700. In any event, the disclosure is not limited to any specific method for identifying the second control device.

In another aspect, the transmission path may be any path used to deliver control signals to a data center component, such as the component 112a, that terminates the transmission path. In general, two control devices may be considered located on the same transmission path if one or more control signals transmitted by one of the control devices pass through the other control device on their way to a given data center component that is being controlled (e.g., component 112a).

In yet another aspect, a control device that is specifically located downstream from the first control device may be identified. A control device may be located downstream relative to another control device, when the former control device is located between the latter control device and the data center component terminating the transmission path. In another aspect, a control device that is specifically located upstream from the first control device may be identified. A control device may be located upstream relative to another control device, when the latter control device is located between the former control device and the data center component terminating the transmission path.

In yet another aspect, as noted, the second control device may be an interface device. One reason for selecting an interface specifically is that interface devices, in the control system 200, may be at higher risk of executing software that is incompatible with a given software update. The elevated risk may be due to the group of interface devices that are found the data center being very large and diverse in its composition. Specifically, interface devices may execute different types of software and they may differ in their hardware configuration. For example, some interface devices may execute software for controlling cooling systems, such as the cooling system 112, and others may be configured to execute software for controlling battery backup systems, or power generators. Thus at any given time instant, the group of interface devices connected to a given managing terminal may include devices that differ in their hardware configurations as well as software.

At task 730, a second update to the software executing on the second control device is determined. The second update may be a different version (e.g., newer or older) of the software that is executing on the second control device (e.g., software 424) at the time when the event is detected. Alternatively, the second update may be entirely different software capable of performing one or more of the functions of the software executing on the second control device when the event is detected. In some aspects, the second update may include all the files needed to install the software from scratch (e.g., the second update may be an installation image) or alternatively, it may be a patch that is usable to modify already installed code. In this example, the second update is an update to the interface software 414 of the interface device 212a.

At task 740, the first update is installed on the first controlled device. By way of example, the first update may be installed remotely by the update server 160. At task 750, the second update is installed on the second control device. For example, the second update may be installed remotely by the server 160, or alternatively, the second update may be installed by the first control device. The disclosure is not limited to any specific method for effectuating the installation of the first and second updates.

FIGS. 8A-D depict flowcharts of example processes 800A-800D, respectively, that are associated with the identification of a second update to software executing on the second control device as specified by task 730 of FIG. 7. According, to the example FIG. 8A, the most recent version of the software running on the second control device (e.g., interface software 414) is identified as the second device (task 810A). The most recent version may be identified, from among all software versions in a repository, based on a release date that is associated with it. An indication of the release date may be stored in the table 638 or elsewhere. Although in this example, the second update is identified based on its own release date only, in other examples, the second update may be identified based on both its release date and the release date of the first software update. In instances where the first software update is an older version of the software currently executing on the first control device (e.g., managing terminal 120a), the second software update may be selected such that it is the latest release prior to the release data of the first update.

According to the example of FIG. 8B, an update to software running on the second control device (e.g., interface device 212a) is identified that is compatible with the first update. As discussed above, the compatibility of the updates may be ascertained by consulting a table, such as the table 634.

Figures 8C, 8D:
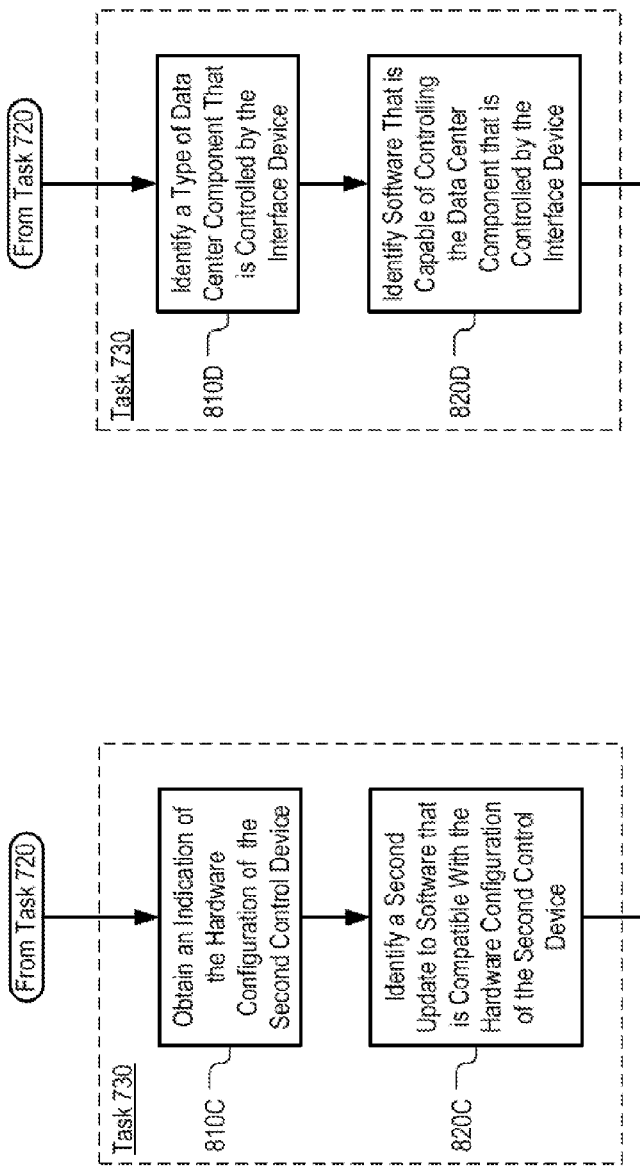
FIG. 8C depicts a flowchart of yet another process related to the process of FIG. 7.
FIG. 8D depicts a flowchart of yet another process related to the process of FIG. 7.

According to the Example of FIG. 8C, an indication of the hardware configuration of the second control device, such as the hardware ID 413, is obtained. For example, the server 160 may query the managing terminal 120a for the hardware ID of the interface device 212a, the managing terminal 120b may interact with the interface device 212a to receive the hardware ID over the connection 250c, after which the managing terminal 120a may forward the hardware ID to the server 160 via the network 140. (task 810C). Once the hardware ID is identified, an update to the software running on the second control device (e.g., interface device 212a) may be identified that is compatible with the hardware configuration of the second control device. As discussed with respect to FIG. 6, tables 632 and 634 may be used to identify the appropriate update.

According to the example of FIG. 8D, a type of the data center component that is controlled by the second control device (e.g., interface device 212a) is identified (task 810D). By way of example only, the type of the data center component may be determined by using a table that relates interface devices with the data center components that they are used to control, or alternatively, it may be identified by querying the second control device. Once the type of the component is identified, a software application capable of controlling the operation of this type of data center component is identified (task 820D). For example, if the data center component is a cooling device, software for controlling cooling devices may be identified. Similarly, if the component is a power generator, software for controlling power generators may be determined.

Figure 9:
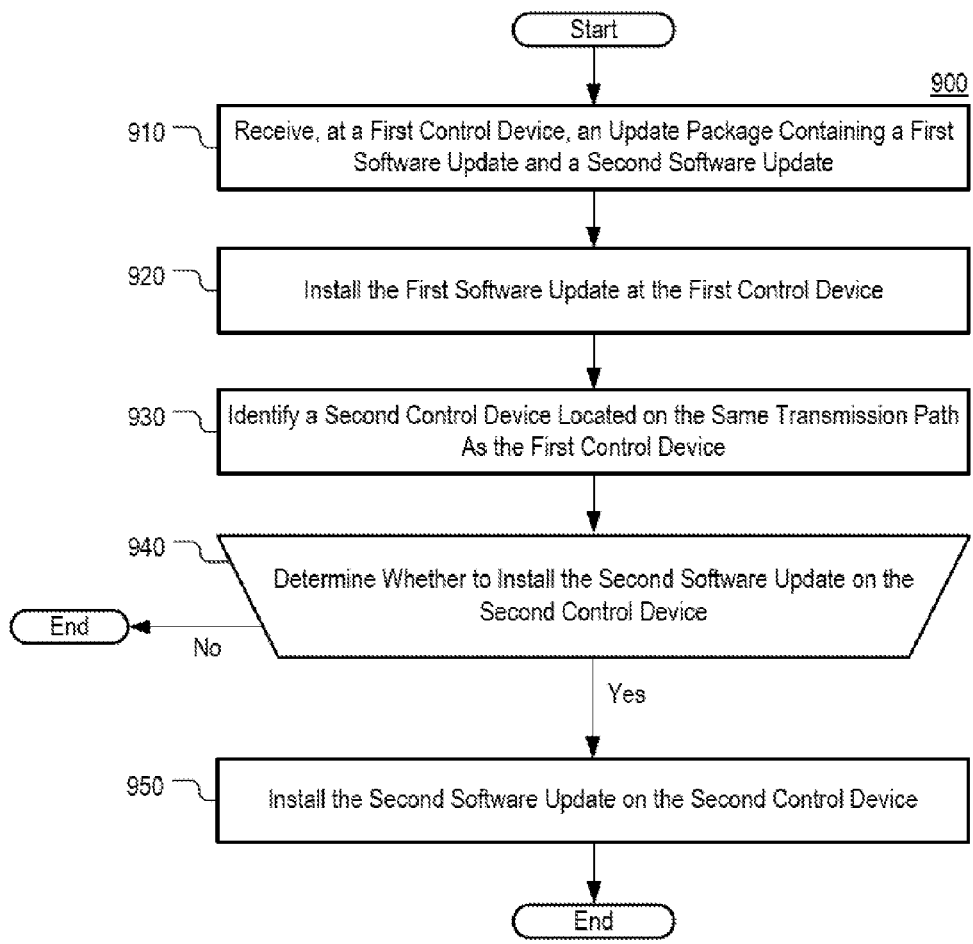
FIG. 9 depicts a flowchart of another process in accordance with aspects of the disclosure.

FIG. 9 depicts a flowchart of an example process 900 in accordance with aspects of the disclosure. At task 910, a first control device receives a software update package. The package may include a first update to software that is executing on the first control device and a second update to software that is executing on a second control device. The first control device may be, e.g., the interface device 212a, the managing terminal 120a, or the computer cluster 150. The second control device may be any other control device that is located on the same transmission path (e.g., transmission path 240) as the first control device. In this example, the first control device may be the managing terminal 120a and the second control device may be the interface device 212a.

At task 920, the first software update is installed on the first control device. At task 930, the first control device identifies the second control device. The second control device may be identified in the manner discussed with respect to task 720. At task 940, the first control device determines whether to install the second software update on the second control device. In some aspects, the first control device may transmit a message to the second control device requesting that the second control device identify the version of software it is running (e.g., interface software 414). If a subsequent response from the second control device indicates that the software running on the second control device is a different version than the second software update (e.g., older or newer), a determination may be made to install the second software update and task 950 may be executed. Otherwise, the execution of the process 900 may stop.

At task 950, the first control device installs the second software update on the second control device. The first control device may transmit the second software update to the second control device along with an instruction to install the second software update. The second instruction may be directed to the second control device or the software running on the second control device. Upon receiving the update and the instruction, the second control device may execute the instruction and install the second software update.

It should be noted that FIGS. 7-9 are provided as examples only. In some aspects, at least some of the tasks associated with FIGS. 7-9 may be performed in a different order than represented, performed concurrently, or altogether omitted. In some aspects, the tasks associated with FIGS. 7-8D may be performed by the update server 160 or another similar device. Tasks in the processes of FIG. 7-8D may be performed by one or all of the server 160, the computer cluster 150, and the computer cluster 150. Furthermore, although in the above example the process 700 is performed for only one control device, in other examples tasks 720-730 and 750 may be repeated for multiple control devices. For instance, the tasks 720-730 and 750 may be repeated for every interface device connected to a managing terminal that is updated. Similarly, although in the above example the process 900 is performed for only one control device, in other examples tasks 930-950 may be repeated for multiple control devices that are connected to a control device that is being updated. For instance, the tasks 930-950 may be repeated for every interface device connected to a managing terminal that is updated.

Moreover, although in the above examples, the functionalities of the computer cluster 150, the managing terminal 120a, and the interface device 212a are implemented in software, in other examples at least some of the functionalities may be implemented in hardware (as one or more digital circuits) or as a combination of hardware and software.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A computer-implemented method for updating software in a system for controlling the operation of a cooling device in a data center, the method comprising:
    detecting an event triggering an installation of a first update to software that is executing on a control device;
    in response to the event, identifying an interface device that connects the control device to the cooling device, the interface device being configured to relay a control signal that is transmitted by the control device to the cooling device;
    identifying, with a processor, a second update to software that is executing on the interface device, wherein the second update is different than the first update; and
    installing the first update and the second update on the control device and the interface device, respectively;
    wherein the interface device is connected directly to the cooling device and the first control device is coupled to the interface device.

2. The method of claim 1, wherein the control signal is a signal that changes a rate at which the cooling device cools equipment in a server rack.

3. The method of claim 1, wherein identifying the second update includes consulting a data record that indicates whether the first update is compatible with the second update.

4. The method of claim 1, wherein:
    the second update is associated with a release date; and
    identifying the second update includes selecting the second update over another update based on the release date.

5. The method of claim 1, further comprising:
    receiving an identifier that is indicative of a hardware configuration of the interface device; and
    wherein the second update is identified based on the received identifier.

6. The method of claim 1, wherein installing the second update includes replacing the software executing on the interface device.

7. The method of claim 1, wherein installing the second update includes patching the software executing on the interface device.

8. A computer-implemented method for updating software in a data center control system, the method comprising:
    detecting an event triggering an installation of a first update to software that is executing on a first control device;
    in response to the event, identifying a second control device that is located downstream from the first control device on a transmission path used to deliver control signals transmitted in a downstream direction by the first control device towards a data center component;
    identifying, with a processor, a second update to software that is executing on the second control device, wherein the second update is different than the first update; and
    installing the first update on the first control device; and
    installing the second update on the second control device.

9. The method of claim 8, wherein the second control device is an interface device.

10. The method of claim 8, wherein the data center component is one of a cooling device or a power backup system.

11. The method of claim 8, wherein:
    the first control device and the second control device are coupled in series to the data center component; and
    the second control device is located between the first control device and the data center component.

12. The method of claim 8, wherein the data center component is a device for controlling a temperature of one or more servers in the data center.

13. The method of claim 8, wherein the data center component is a device for providing power to one or more servers in the data center.

14. The method of claim 8, wherein the data center component is a lighting system for illuminating at least a portion of the data center.

15. The method of claim 8, wherein:
    the second update is associated with a release date; and
    identifying the second update includes selecting the second update over another update based on the release date.

16. The method of claim 8, wherein identifying the second update includes consulting a data record that indicates whether the first update is compatible with the second update.

17. A computer-implemented method for updating software in a data center control system, the method comprising:

detecting, with a processor, an event triggering an installation of a first update to software that is executing on a first control device; and in response to the event, installing a second update on a second control device that is located, together with the first control device, on a transmission path used to deliver a control signal to a data center component, the second control device is between the first control device and the data center component in the transmission path;

wherein the second update is an update to software that is different than the first update and is executed on the second control device; and wherein the control signal is a signal that causes the data center component to transition from one operational state to another operational state.

18. The method of claim 17, wherein the data center component is one of a cooling device and a power backup system.

19. The method of claim 17, further comprising identifying the second update by consulting a data record that indicates whether the first update is compatible the second update.

20. The method of claim 17, wherein the data center component is a device for controlling a temperature of one or more servers in the data center.

21. The method of claim 17, wherein the data center component is a device for providing power to one or more servers in the data center.

22. The method of claim 17, wherein the data center component is a lighting device for illuminating at least a portion of the data center.

23. A data center comprising:
a first data center component;
a second data center component;
a managing device;
a first interface device coupled to the first data center component and the managing device, the first interface device being configured to relay a first control signal generated by the managing device to the first data center component;
a second interface device coupled to the second data center component and the managing device, the second interface device being configured to relay a second control signal generated by the managing device to the second data center component; and
a server, having one or more processors, that is configured to:
detect an event triggering an installation of a first update to software executing on the managing device;
identify a second update to software executing on the first interface device, the second update being different from the first update;
identify a third update to software executing on the second interface device, the third update being different from the second update; and
install the first update, the second update, and the third update on the managing device, the first interface device, and the second interface device, respectively.

24. The data center of claim 23, wherein the first interface device is configured to generate a first analog signal in response to one or more messages received over a digital connection with the managing device, the one or more messages constituting the first control signal.

25. The data center of claim 23, wherein the first data center component is a cooling device and the second data center component is a battery backup system.

26. The data center of claim 23, wherein identifying the second update includes consulting a data record that indicates whether the first update is compatible with the second update.

* * * * *